United States Patent
Shin et al.

(10) Patent No.: US 12,145,423 B2
(45) Date of Patent: Nov. 19, 2024

(54) AIR CONDITIONER SYSTEM FOR ELECTRIC MOTOR MOBILITY VEHICLES

(71) Applicants: Hyundai Motor Company, Seoul (KR); Kia Corporation, Seoul (KR)

(72) Inventors: Gee Young Shin, Suwon-si (KR); Su Yeon Kang, Seoul (KR); Dae Hee Lee, Incheon (KR); Myung Hoe Kim, Seoul (KR); Dong Ho Kwon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 214 days.

(21) Appl. No.: 17/888,929

(22) Filed: Aug. 16, 2022

(65) Prior Publication Data
US 2023/0173878 A1 Jun. 8, 2023

(30) Foreign Application Priority Data
Dec. 8, 2021 (KR) .................. 10-2021-0174883

(51) Int. Cl.
*B60H 1/00* (2006.01)
*B60H 1/32* (2006.01)

(52) U.S. Cl.
CPC ..... *B60H 1/00849* (2013.01); *B60H 1/00064* (2013.01); *B60H 1/00278* (2013.01); *B60H 1/00392* (2013.01); *B60H 1/3229* (2013.01); *B60H 2001/00307* (2013.01); *B60H 1/00921* (2013.01); *B60H 2001/00928* (2013.01)

(58) Field of Classification Search
CPC ............ B60H 1/00064; B60H 1/00278; B60H 1/00392; B60H 1/3229; B60H 2001/00307; B60H 1/143; B60H 1/00021; B60H 2001/003; B60H 2001/00928; B60K 11/04; B60K 11/085
See application file for complete search history.

(56) References Cited

U.S. PATENT DOCUMENTS 5,634,348 A * 6/1997 Ikeda ................ F24F 3/153
62/229

FOREIGN PATENT DOCUMENTS

KR 10-2008-0092527 A 10/2008

* cited by examiner

*Primary Examiner* — Lionel Nouketcha
(74) *Attorney, Agent, or Firm* — Morgan, Lewis & Bockius LLP

(57) ABSTRACT

An air conditioner system for an electric motor mobility vehicle is provided. The air conditioner system is configured so that an external condenser is spaced from a radiator at a front portion of the mobility vehicle, the external condenser performs heat exchange with air introduced from a location other than the front portion of the mobility vehicle, so that an active air flap is controlled to be closed in an indoor heating condition. Therefore, as the air resistance is reduced while the mobility vehicle drives under the indoor heating condition, the air resistance is reduced and the aerodynamic performance of the mobility vehicle is improved.

20 Claims, 10 Drawing Sheets

AIR CONDITIONER SYSTEM FOR ELECTRIC MOTOR MOBILITY VEHICLES

CROSS REFERENCE TO RELATED APPLICATION

The present application claims priority to Korean Patent Application No. 10-2021-0174883, filed Dec. 8, 2021, the entire contents of which is incorporated herein for all purposes by this reference.

BACKGROUND OF THE PRESENT DISCLOSURE

Field of the Present Disclosure

The present disclosure relates to an air conditioner system for an electric motor mobility vehicle, wherein in indoor cooling and heating, the air conditioner system is configured to reduce an opening operation of an active air flap to prevent aerodynamic performance of the mobility vehicle from being degraded as the active air flap is opened.

Description of Related Art

Recently, electric vehicles have been on the rise as a social issue such as the implementation of environmentally friendly technology and exhaustion of energy. The electric vehicles are operated using a motor that receives electricity from a battery and outputs power. Therefore, electric vehicles are receiving attention as eco-friendly vehicles because such electric vehicles do not emit carbon dioxide, make low noise, and have motor with higher energy efficiency of than an engine.

A key technology for implementing such the electric vehicles is a technology related to a battery module, and recent studies are being actively carried on light weight, miniaturization, and short charging time of batteries. The battery module should be used in optimal temperature environment to maintain optimal performance and long lifespan.

Furthermore, because the electric vehicle has no waste heat source generated during combustion in a separate engine like an internal combustion engine, indoor heating of the electric vehicles is performed using an electric heating device in winter, and because warm-up is required to improve battery charging and discharging performance in cold weather, a separate coolant heating type electric heater is used. In other words, to maintain the optimal temperature environment of the battery module, a technology is used in the electric vehicles to operate a heating and cooling system for temperature control of the battery module separately from a heating and cooling system for indoor air conditioning of a vehicle.

Meanwhile, the electric vehicles perform cooling and heating by use of an air conditioner, and are configured to suction air for securing air conditioning performance and cooling electrical component.

Furthermore, an electric vehicle is provided with an active air flap to selectively provide air to drive-line components and the electrical components together with the air conditioner, so that the active air flap is controlled in response to a driving condition of the mobility vehicle.

However, the active air flap used in the electric vehicle generates cooling air in the air conditioner, performs cooling of the electrical components, performs cooling of a battery, or is operated to be opened to ventilate air under a certain heating condition, so that aerodynamic performance of the mobility vehicle is reduced. In other words, as the active air flap of the electric vehicle is operated to be opened even under the condition of adjusting the indoor temperature, the aerodynamic force of the mobility vehicle is increased while driving, and the fuel efficiency of the mobility vehicle is rather deteriorated.

The foregoing referred to as the controller and the controlling method of operating a fuel cell is intended merely to aid in the understanding of the background of the present disclosure, and is not intended to mean that the present disclosure falls within the purview of the related art which is already known to those skilled in the art.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air conditioner system for an electric motor mobility vehicle, wherein the air conditioner system is configured to reduce opening operation of an active air flap in indoor cooling and heating to prevent aerodynamic performance of the mobility vehicle from being degraded as the active air flap is opened.

In various aspects of the present disclosure, there is provided an air conditioner system for an electric motor mobility vehicle, the air conditioner system including: an air conditioner including an internal condenser, an evaporator, and an external condenser which may be modularized; an active air flap configured to selectively intermit air passing through a radiator; and a controller configured to allow air to pass through the evaporator of the air conditioner and to allow the active air flap to be opened in indoor cooling, and configured to allow the air to pass through the internal condenser of the air conditioner and to allow the active air flap to be closed in indoor heating.

The air conditioner may include a first housing and a second housing, the first housing including a first blower and ventilating outdoor air or indoor air, and the second housing fluidically-communicating with the first housing and including the internal condenser, the evaporator, the external condenser, and a second blower.

The second housing may be divided into a first space in which the internal condenser and the evaporator are provided and a second space in which the external condenser and the second blower are provided, and the first housing and the first space of the second housing may fluidically communicate with each other, and the second space of the second housing may be formed so that the outdoor air or air in a PE module may be selectively ventilated thereinto.

The second space of the second housing may include a change door between a ventilation path of the outdoor air and an air ventilation path of the PE module, and the change door may be configured to allow the outdoor air or the air of the PE module to be selectively ventilated into the external condenser.

The second housing may include a temperature adjustment door between the internal condenser and the evaporator, and the temperature adjustment door may be configured to allow air to be selectively ventilated into the internal condenser and the evaporator.

The air conditioner system may include: a refrigerant line in which a refrigerant may be circulated, the refrigerant line including a compressor, the internal condenser, the external condenser, an expander, and the evaporator; and a coolant line in which a coolant may be circulated, the coolant line including a heat exchanger performing heat exchange with the refrigerant, a valve, the PE module, a battery module, and the radiator.

The coolant line may include a first coolant line in which the radiator, a first heat exchanger, a reservoir, a first water pump, the PE module, and a first valve are provided, and a second coolant line diverging from the reservoir of the first coolant line and including a second valve, the battery module, a second water pump, and a second heat exchanger.

The refrigerant line may include a first refrigerant line including the compressor, the internal condenser, the first heat exchanger, a first expander, the external condenser, a second expander, and the evaporator, and a second refrigerant line diverging from the first refrigerant line and connected to the compressor and including a third expander and the second heat exchanger.

In cooling air, the controller may allow the first expander to be opened, the second expander and the third expander to expand the refrigerant, and the first valve and the second valve to be switched so that the coolant may be circulated in each of the first coolant line and the second coolant line.

In cooling the air, the controller may allow a radiator fan to be driven and the active air flap to be opened.

In heating air, the controller may allow the first expander to expand the refrigerant, the second expander to be closed, the third expander to be opened, and the first valve and the second valve to be switched so that the refrigerant may be circulated into the second coolant line with the first water pump and the PE module of the first coolant line.

In heating air, the controller may allow a radiator fan to be unoperated and the active air flap to be closed.

The air conditioner system including the described-above structure is configured so that the external condenser is spaced from the radiator at a front portion of the mobility vehicle and the external condenser performs heat exchange with air introduced from a location other than the front portion of the mobility vehicle, so that the active air flap is controlled to be closed in an indoor heating condition. Therefore, as the air resistance is reduced while the mobility vehicle drives under the indoor heating condition, the air resistance is reduced and the aerodynamic performance of the mobility vehicle is improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
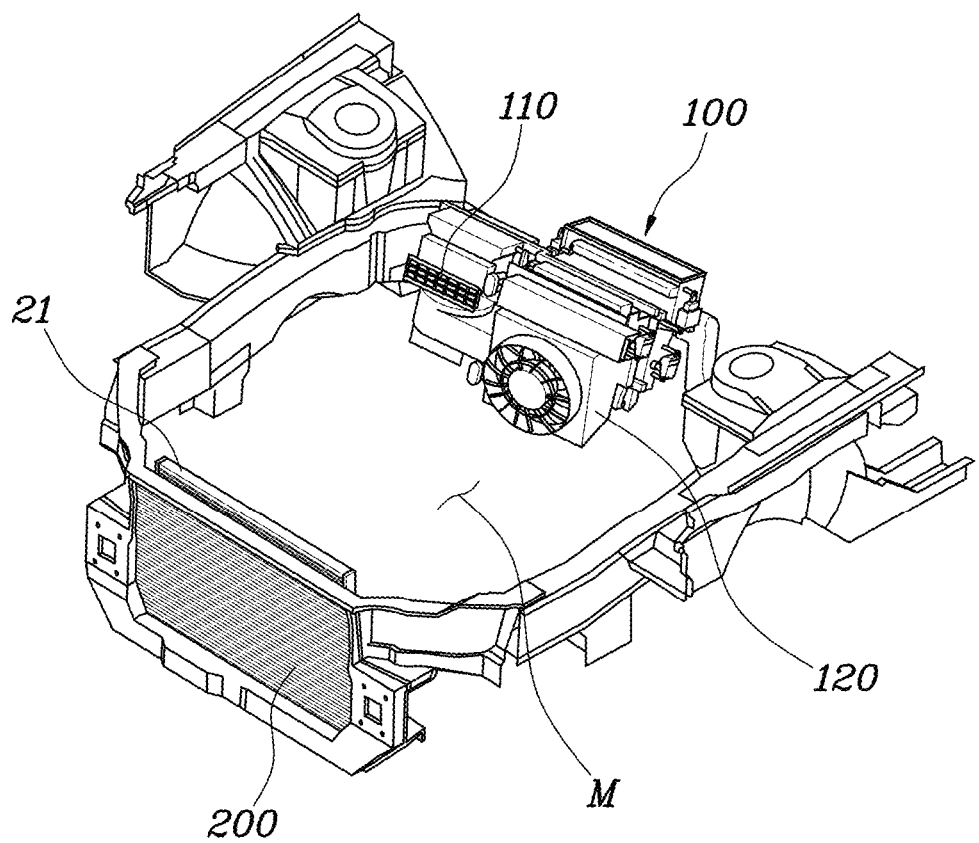
FIG. 1 is a view a mobility vehicle including an air conditioner system for an electric motor mobility vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, an air conditioner system for an electric motor mobility vehicle will be described according to various exemplary embodiments of the present disclosure.

Figure 2:
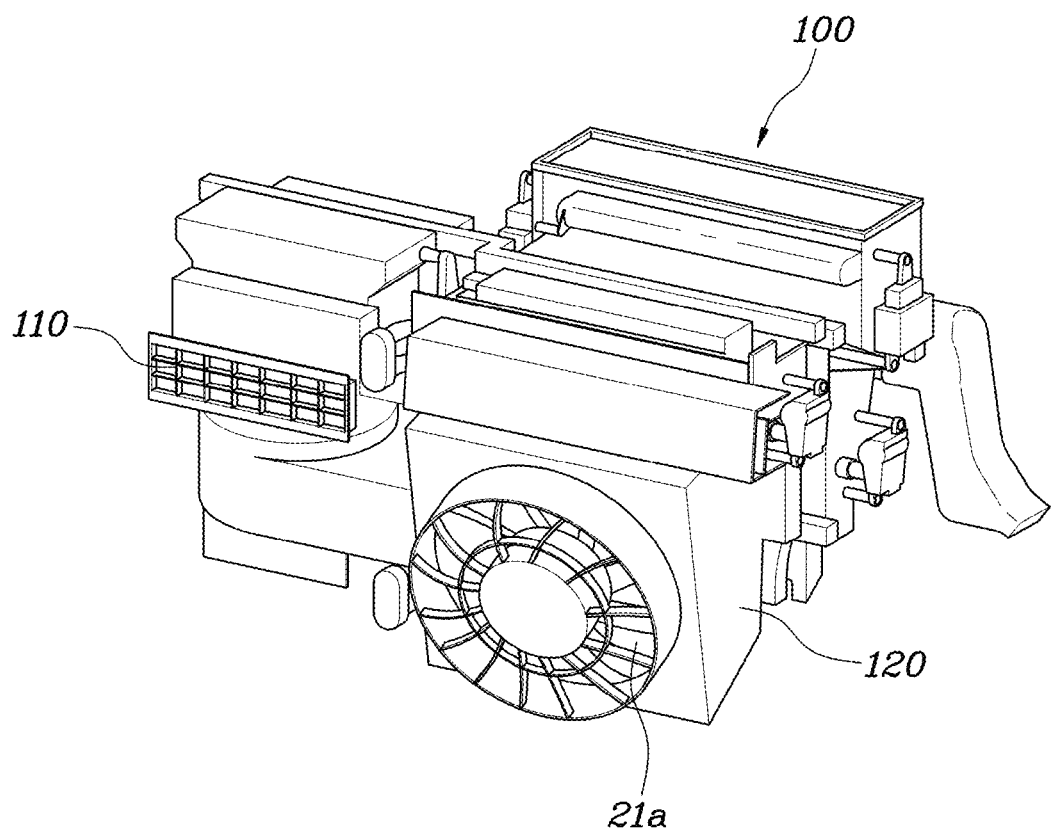
FIG. 2 is a view showing an air conditioner for an electric motor mobility vehicle according to an exemplary embodiment of the present disclosure.
Figure 3:
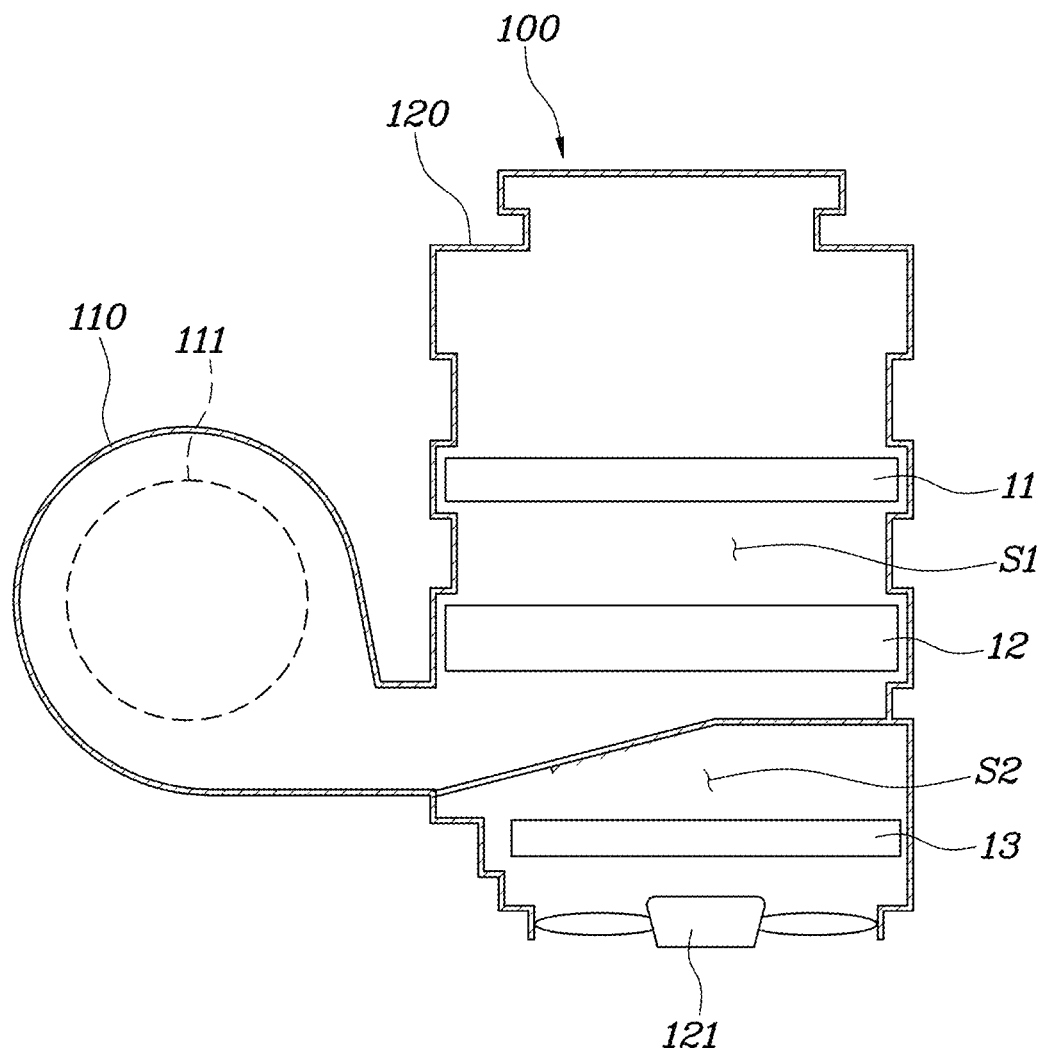
FIG. 3 is an upper sectional view showing the air conditioner for an electric motor mobility vehicle shown in FIG. 1.
Figure 4:
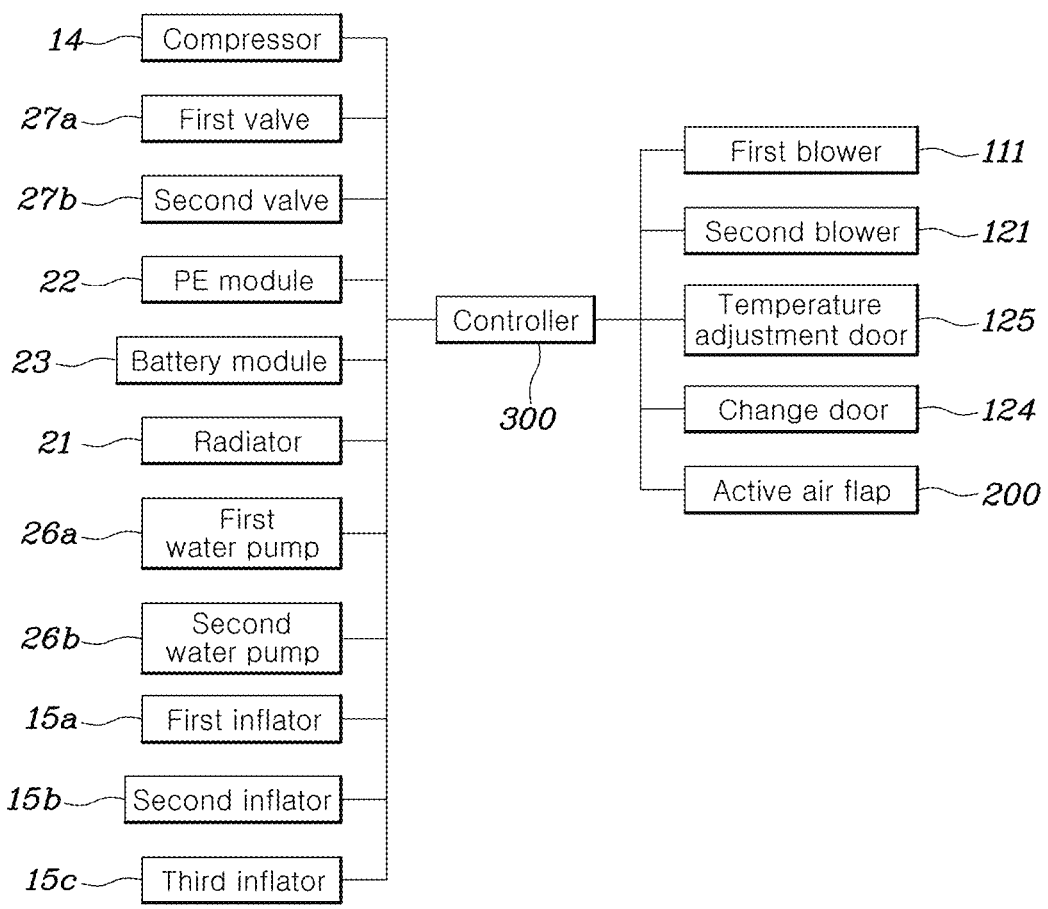
FIG. 4 is a block diagram showing the air conditioner for an electric motor mobility vehicle according to an exemplary embodiment of the present disclosure.
Figure 5:
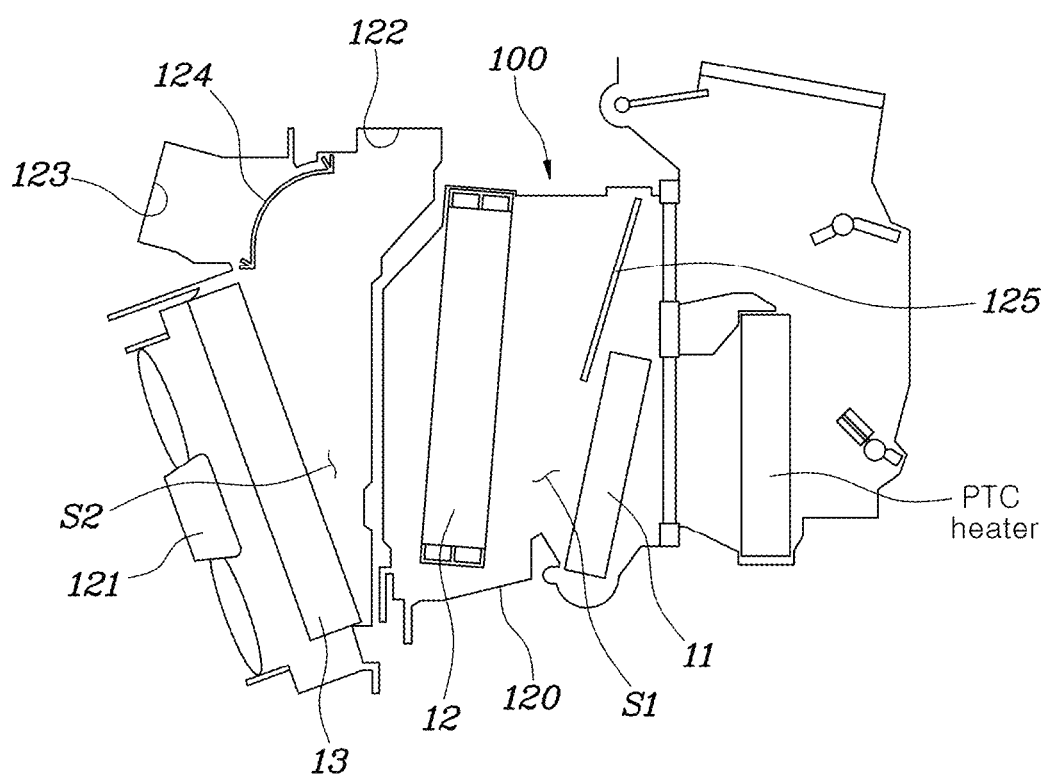
FIG. 5 is a side sectional view showing the air conditioner for an electric motor mobility vehicle shown in FIG. 1.

FIG. 1 is a view a mobility vehicle including an air conditioner system for an electric motor mobility vehicle according to an exemplary embodiment of the present disclosure. FIG. 2 is a view showing an air conditioner for an electric motor mobility vehicle according to an exemplary embodiment of the present disclosure. FIG. 3 is an upper sectional view showing the air conditioner for an electric motor mobility vehicle shown in FIG. 1. FIG. 4 is a block diagram showing the air conditioner for an electric motor mobility vehicle according to an exemplary embodiment of the present disclosure. FIG. 5 is a side sectional view showing the air conditioner for an electric motor mobility vehicle shown in FIG. 1.

Figure 6:
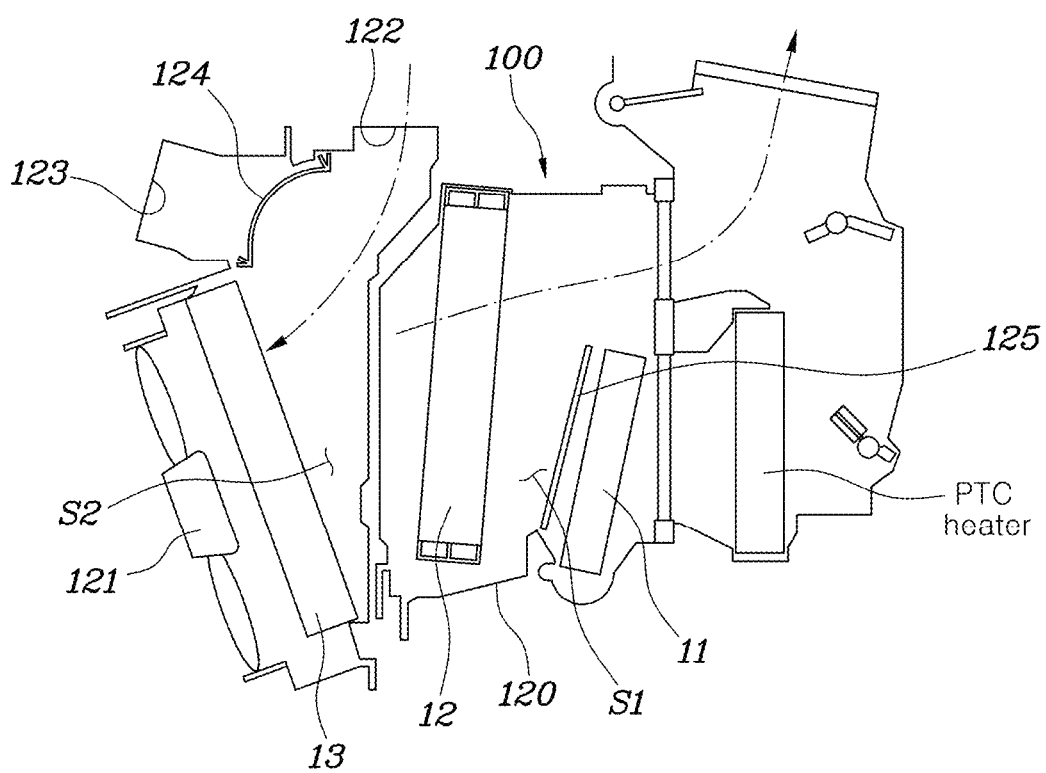
FIG. 6 is a view showing a cooling mode of the air conditioner for an electric motor mobility vehicle shown in FIG. 1.
Figure 7:
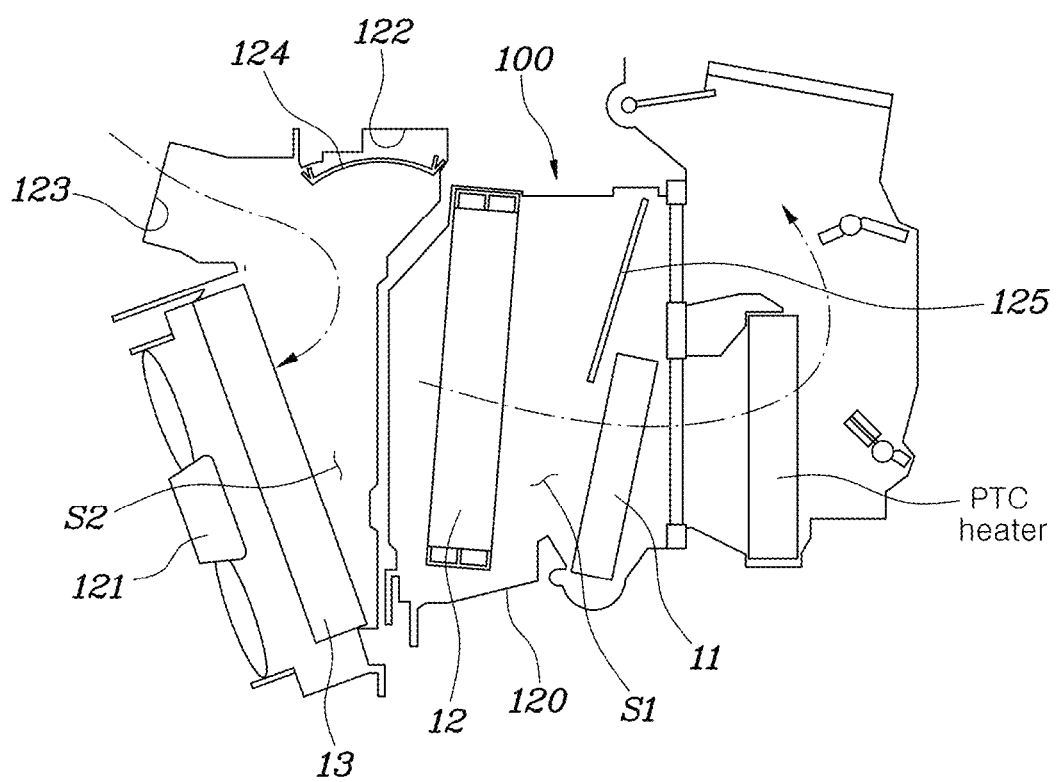
FIG. 7 is a view showing a heating mode of the air conditioner for an electric motor mobility vehicle shown in FIG. 1.

FIG. 6 is a view showing a cooling mode of the air conditioner for an electric motor mobility vehicle shown in FIG. 1. FIG. 7 is a view showing a heating mode of the air conditioner for an electric motor mobility vehicle shown in FIG. 1.

Figure 8:
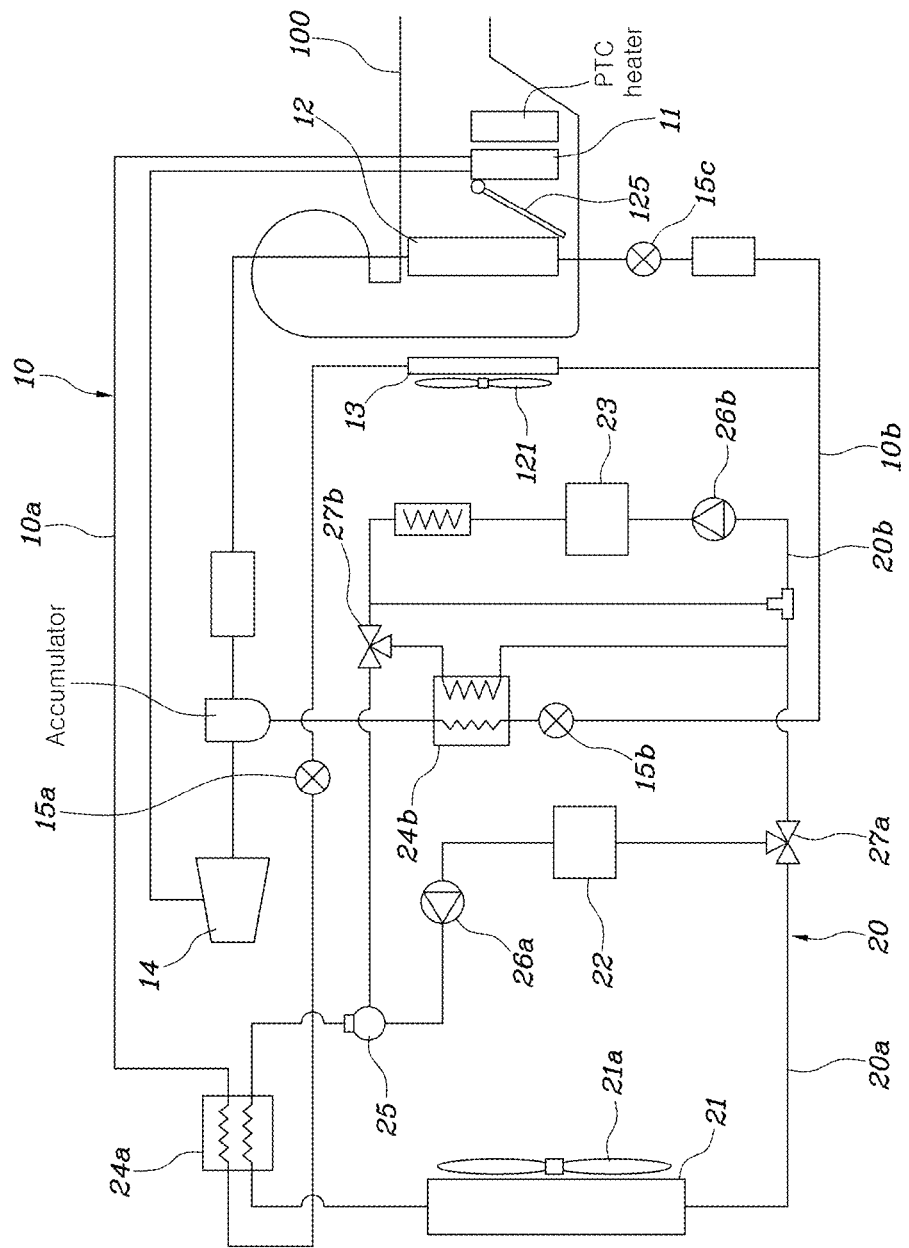
FIG. 8 is a circuit diagram showing the air conditioner system for an electric motor mobility vehicle according to various exemplary embodiments of the present disclosure.
Figure 9:
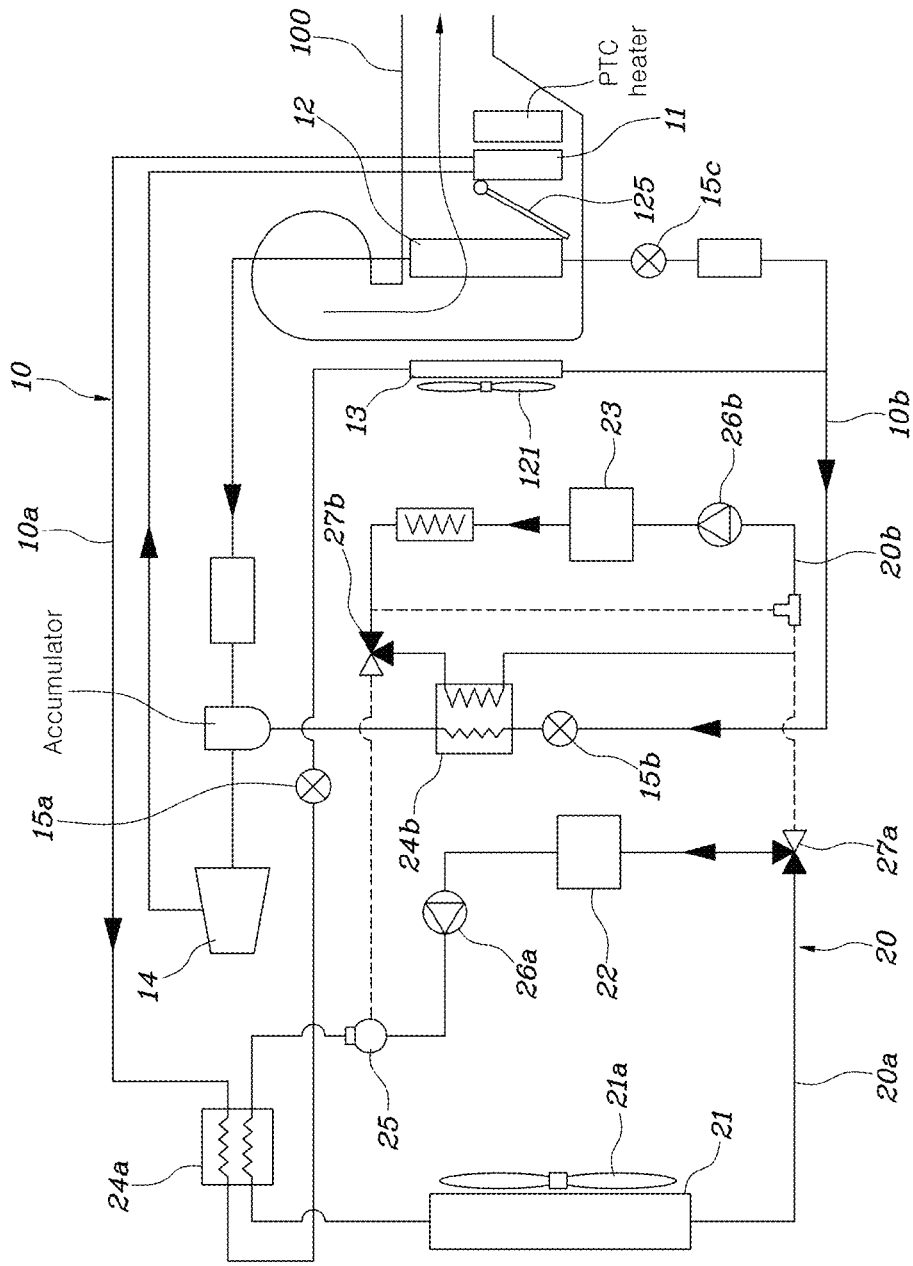
FIG. 9 is a view showing cooling of the air conditioner system for an electric motor mobility vehicle shown in FIG. 8.
Figure 10:
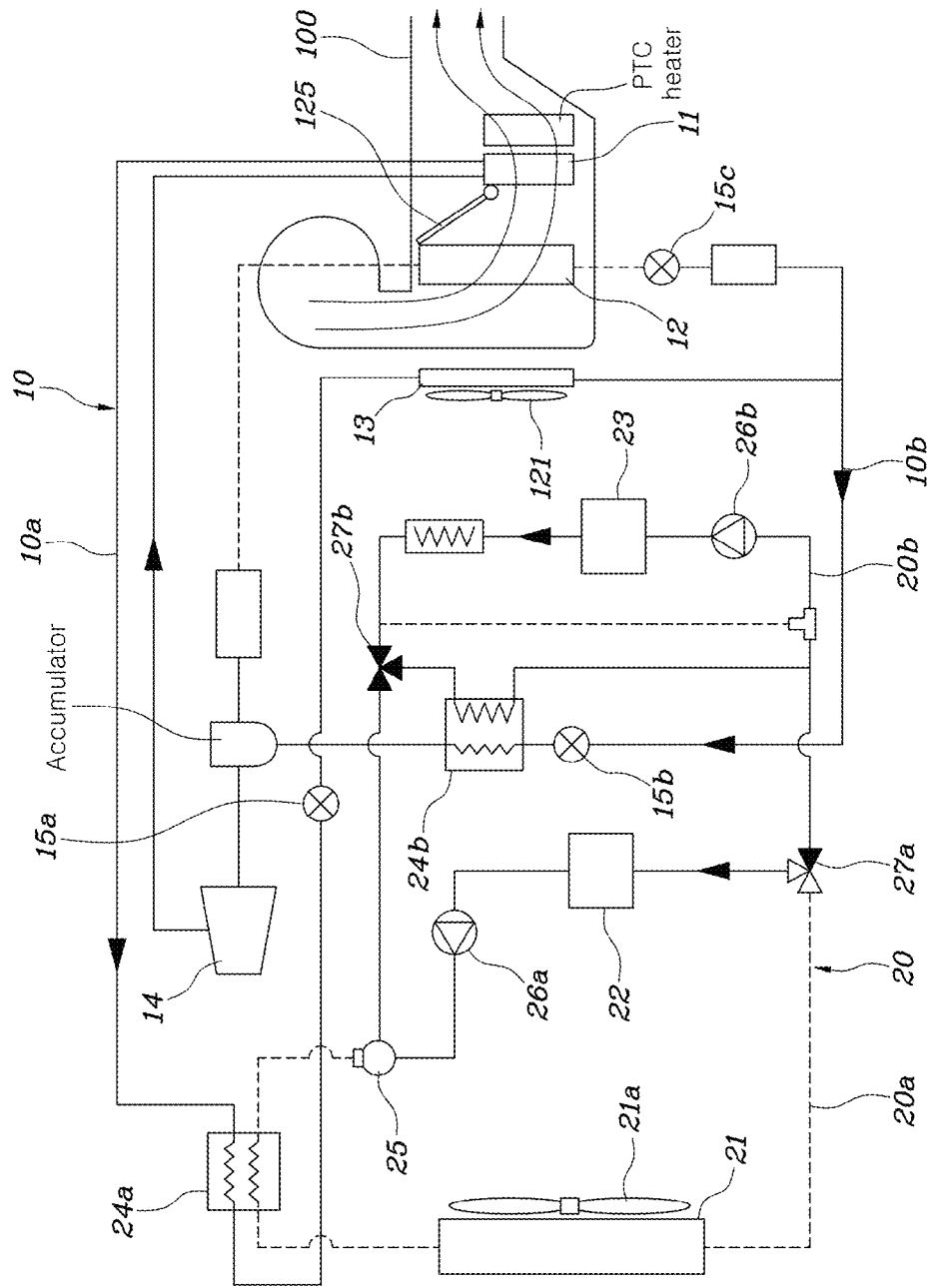
FIG. 10 is a view showing heating of the air conditioner system for an electric motor mobility vehicle shown in FIG. 8.

FIG. 8 is a circuit diagram showing the air conditioner system for an electric motor mobility vehicle according to various exemplary embodiments of the present disclosure. FIG. 9 is a view showing cooling of the air conditioner system for an electric motor mobility vehicle shown in FIG. 8. FIG. 10 is a view showing heating of the air conditioner system for an electric motor mobility vehicle shown in FIG. 8.

According to an exemplary embodiment of the present disclosure, as shown in FIG. 1, FIG. 2, FIG. 3, FIG. 4, and FIG. 5, the air conditioner system for an electric motor mobility vehicle includes: an air conditioner 100 including an internal condenser 11, an evaporator 12, an external condenser 13 that are modularized; an active air flap 200 selectively intermitting air passing through a radiator 21; and a controller 300 allowing air to pass through the evaporator 12 of the air conditioner 100 and allowing the active air flap 200 to be opened in indoor cooling, and allowing the air to pass through the internal condenser 11 of the air conditioner 100 and allowing the active air flap 200 to be closed in indoor heating.

According to an exemplary embodiment of the present disclosure, the air conditioner 100 and the active air flap 200 are mounted in a front space M of the mobility vehicle. Herein, the active air flap 200 is provided in a front portion of the front space M of the mobility vehicle and configured to adjust an inflow rate of air passing through the radiator 21 and then introduced into the front space M. The air conditioner 100 is provided in a rear portion of the front space M of the mobility vehicle, so that outdoor air is introduced from a cowl of the mobility vehicle or air circulated in a PE component provided in the front space M is introduced.

The air conditioner 100 includes the internal condenser 11 heating the ventilated air to generate heating air, the evaporator 12 cooling the ventilated air to generate cooling air, and the external condenser 13.

In other words, the external condenser 13 is provided to secure cooling and heating efficiency by a heat pump performing heat exchange between the refrigerant, which is circulated in the internal condenser 11 and the evaporator 12, and other cooling medium. The external condenser 13 is provided in the rear portion of the front space M of the mobility vehicle, not in the front portion of the front space M of the mobility vehicle.

Therefore, as the external condenser 13 does not perform heat exchange at the front portion of the front space M of the mobility vehicle, but performs heat exchange with air ventilated through a separate flow path, when a situation in which the external condenser 13 should perform heat exchange occurs, even when the active air flap 200 performs a closing operation, an air conditioning function may be performed by heat exchange of the external condenser 13.

Therefore, in indoor cooling, the controller 300 allows the air to pass through the evaporator 12 of the air conditioner 100 to generate cooling air, and allows the active air flap 200 to be opened to efficiently perform a cooling function by emitting heat from and cooling the refrigerant and the coolant.

Meanwhile, in indoor heating, the controller 300 allows the air to pass through the internal condenser 11 of the air conditioner 100 to generate heating air, and allows the active air flap 200 to be closed. Conventionally, an external condenser is provided at the radiator 21, so that the active air flap 200 may be opened to absorb heat of the external condenser 13. However, according to an exemplary embodiment of the present disclosure, the external condenser 13 is modularized in the air conditioner 100 and performs heat exchange with the air introduced from a separate flow path, so that the active air flap 200 may be closed thus securing aerodynamic performance of the mobility vehicle.

As described above, according to an exemplary embodiment of the present disclosure, the active air flap 200 is closed under an indoor heating condition, so that indoor heating is efficiently performed and the aerodynamic performance of the mobility vehicle is secured thus improving fuel efficiency.

In describing the present disclosure in detail, the air conditioner 100 includes a first housing 110 including a first blower 111 and ventilating outdoor air or indoor air, and a second housing 120 fluidically-communicating with the first housing 110 and including the internal condenser 11, the evaporator 12, the external condenser 13, and a second blower 121.

The air conditioner 100 includes the first housing 110 and the second housing 120. The first housing 110 may include the first blower 111, an indoor and outdoor air door, and a filter, etc. The second housing 120 includes the internal condenser 11, the evaporator 12, the external condenser 13, and the second blower 121.

Therefore, when the first blower 111 is operated, outdoor air or indoor air is introduced into the first housing 110, and the outdoor air or the indoor air is adjusted in the temperature through the evaporator 12 or the internal condenser 11 and may be supplied indoors as conditioned air. Furthermore, when the conditioned air is supplied indoors, the evaporator 12 and the internal condenser 11 are activated in response to the temperature required in the indoor space, and the temperature of the air ventilated indoors is adjusted. Therefore, the second housing 120 includes a temperature adjustment door 125 between the internal condenser 11 and the evaporator 12. The air is selectively ventilated into the internal condenser 11 and the evaporator 12 by the temperature adjustment door 125, adjusting the temperature of the conditioned air supplied indoors. The temperature adjustment door 125 may be operated in a sliding manner or a rotating manner. Furthermore, the temperature adjustment door 125 fully or partially opens or closes the internal condenser 11 or the evaporator 12, so that the ventilated air may be adjusted in the temperature by passing through the internal condenser 11 and the evaporator 12.

Meanwhile, when the second blower 121 is operated, outdoor air or air in the front space M of the mobility vehicle is introduced into the housing and exchanges heat at the external condenser 13.

The second housing 120 includes a first space S1 including the internal condenser 11 and the evaporator 12 and a second space S2 including the external condenser 13 and the second blower 121. The first housing 110 and the first space S1 of the second housing 120 fluidically communicate with each other and the second space S2 of the second housing 120 is formed so that the outdoor air or the air in a PE (power electric) module 22 is selectively ventilated thereinto.

As described above, the air ventilated in the second housing 120 is adjusted in the temperature by the internal condenser 11 and the evaporator 12 of the first space S1 and exchanges heat at the external condenser 13 of the second space S2 thus implementing the heat pump.

The indoor air or the outdoor air introduced through the first housing 110 is ventilated in the first space S1 of the second housing 120 and is adjusted in the temperature by the internal condenser 11 or the evaporator 12 to be supplied indoors as the conditioned air.

Furthermore, the outdoor air is introduced into the second space S2 of the second housing 120 from a cowl region of the mobility vehicle or the air ventilated into the PE module 22 from a space in the front portion of the mobility vehicle is selectively ventilated into the second space S2 of the second housing 120, and then the outdoor air or the air in the PE module 22 exchanges heat at the external condenser 13.

For the above action, the second space S2 of the second housing 120 includes a change door 124 between a ventilation path 122 of the outdoor air and an air ventilation path 123 of the PE module, and the outdoor air or the air in the PE module 22 is selectively ventilated into the external condenser 13 by the change door 124. Because the external condenser 13 should perform heat exchange by air circulation for the implementation of the heat pump, the ventilation path 122 of the outdoor air and the air ventilation path 123 of the PE module are provided in the second space S2 of the second housing 120. Furthermore, in the second space S2 of the second housing 120, the ventilation path 122 of the outdoor air and the air ventilation path 123 of the PE module are selectively opened or closed by the change door 124. Therefore, in response to the cooling or heating condition, the outdoor air or the air in the PE module 22 exchanges heat at the external condenser 13, so that the heat pump and cooling and heating efficiency may be secured.

Therefore, according to an exemplary embodiment of the present disclosure, when indoor cooling is required, the first blower 111 is operated to allow the indoor air or the outdoor air to be ventilated into the first housing 110 and the second housing 120, as shown in FIG. 6. The circulation of the refrigerant activates operation of cooling air of the evaporator 12 and the temperature adjustment door 125 blocks air ventilation at the internal condenser 11. Therefore, as the first blower 111 is operated, the ventilated indoor air or outdoor air passes through the evaporator 12 and cool air may be supplied indoors.

Furthermore, in cooling air, the change door 124 is operated to introduce outdoor air into the second space S2 of the second housing 120, the outdoor air exchanges heat at the external condenser 13 thereby implementing the heat pump.

Meanwhile, in heating air, the controller 300 allows the first blower 111 to be operated, cooling air operation due to the evaporator 12 to be deactivated, and the temperature adjustment door 125 to be operated to allow air ventilation into the internal condenser 11.

As shown in FIG. 7, when the indoor air heating is required, the first blower 111 is operated so that the indoor air or the outdoor air is ventilated into the first housing 110. The circulation of the refrigerant is controlled to deactivate the evaporator 12, operation of heating air of the internal condenser 11 is activated, and the temperature adjustment door 125 is operated to allow air ventilation of the internal condenser 11. Therefore, the indoor air or the outdoor air ventilated by operation of the first blower 111 is heated while passing through the internal condenser 11 and the heated air may be supplied indoors.

Furthermore, in heating air, the change door 124 is operated to introduce the air circulated in the PE component into the second space S2 of the second housing 120, and the introduced air exchanges heat at the external condenser 13, implementing the heat pump. In other words, the air circulated in the PE component cools the PE components thus increasing in the temperature, so that the heat exchange efficiency between the air and the external condenser 13 acting as the evaporator 12 is improved in heating air.

Meanwhile, according to an exemplary embodiment of the present disclosure, the air conditioner system for an electric motor mobility vehicle includes: a refrigerant line 10 in which a refrigerant is circulated, the refrigerant line 10 including a compressor 14, the internal condenser 11, the external condenser 13, the expander, and the evaporator 12; and a coolant line 20 in which a coolant is circulated, the coolant line 20 including the heat exchanger performing heat exchange with the coolant, the valve, the PE module 22, a battery module 23, and the radiator 21.

The coolant line 20 includes: a first coolant line 20a including the radiator 21, a first heat exchanger 24a, a reservoir 25, a first water pump 26a, the PE module 22, and a first valve 27a; and a second coolant line 20b diverging from the reservoir 25 of the first coolant line 20a and including a second valve 27b, the battery module 23, a second water pump 26b, and a second heat exchanger 24b.

Furthermore, the refrigerant line 10 includes: a first refrigerant line 10a including the compressor 14, the internal condenser 11, the first heat exchanger 24a, a first expander 15a, the external condenser 13, a second expander 15b, and the evaporator 12; and a second refrigerant line 10b diverging from the first refrigerant line 10a and connected to the compressor 14, and including a third expander 15c and the second heat exchanger 24b.

The first refrigerant line 10a and the first coolant line 20a are configured so that the refrigerant and coolant therein exchange heat with each other through the first heat exchanger 24a. The second refrigerant line 10b and the second coolant line 20b are configured so that the refrigerant and the coolant exchange heat with each other through the second heat exchanger 24b.

Furthermore, the refrigerant line 10 may include an accumulator for refrigerant circulation, a coolant heater provided to improve heat exchange efficiency between the refrigerant and the coolant, an additional heat exchanger, etc.

In an exemplary embodiment of the present invention, a first bypass line 35 is provided to diverge from the second coolant line 20b to connect to the second heat exchanger 24b and the second valve 27b to bypass the second water pump 26b and the battery module 23.

In an exemplary embodiment of the present invention, a second bypass line 37 is provided to diverge from the second coolant line 20b to bypass the second water pump 26b and the battery module 23.

Therefore, the air conditioner system of the present disclosure realizes the heat pump in indoor cooling and heating, securing the air conditioning efficiency.

Controlling the air conditioner system of the present disclosure in the indoor cooling or the indoor heating will be referred to as follows.

In cooling air, the controller 300 allows the first expander 15a to be opened, the second expander 15b and the third expander 15c to expand the refrigerant, and the first valve 27a and the second valve 27b to be switched so that the coolant is circulated into the first coolant line 20a and the second coolant line 20b.

As shown in FIG. 9, the refrigerant compressed in the compressor 14 is condensed so that heat thereof is emitted while the refrigerant is circulated into the internal condenser 11, the first heat exchanger 24a, and the external condenser 13, and then the refrigerant is expanded by the third expander 15c. Therefore, as the evaporator 12 performs evaporation of the refrigerant, air passing through the evaporator 12 is cooled.

In the first coolant line 20a, the coolant cools the PE module 22, the coolant cooled by the radiator 21 exchanges heat with the refrigerant by the first heat exchanger 24a, so that the refrigerant may be condensed in the first heat exchanger 24a. Furthermore, in the second coolant line 20b, the coolant increased in the temperature while cooling the battery module 23 exchanges heat with the refrigerant by the second heat exchanger 24b, so that the temperature of the coolant may be adjusted to a temperature capable of cooling the battery module 23.

Furthermore, the controller 300 allows a radiator fan 21a to be driven and the active air flap 200 to be opened in cooling air, so that the coolant may be efficiently cooled by the radiator 21.

Therefore, cooling air supplied indoors may be performed.

In heating air, the controller 300 allows the first expander 15a to expand the refrigerant, the second expander 15b to be closed, the third expander 15c to be opened, and allows the first valve 27a and the second valve 27b to be switched so that the coolant is circulated into the second coolant line 20b with the first water pump 26a and the PE module 22 of the first coolant line 20a.

As shown in FIG. 10, in heating air, the controller 300 allows the first expander 15a to expand the refrigerant, the second expander 15b to be opened, the third expander 15c to be closed, and the first valve 27a and the second valve 27b to be switched so that the coolant is circulated into the second coolant line 20b with the first water pump 26a and the PE module 22 of the first coolant line 20a. In other words, the refrigerant in the first coolant line 20a is not circulated into the radiator 21 and the first heat exchanger 24a.

The refrigerant compressed in the compressor 14 is condensed by being circulated into the internal condenser 11 and emitting heat and then is expanded by the first expander 15a. Furthermore, the refrigerant exchanges heat in the external condenser 13, and the refrigerant with low temperature exchanges heat with the coolant in the second heat exchanger 24b, so that the coolant may be cooled.

Furthermore, in heating air, the controller 300 allows the radiator fan to be unoperated and the active air flap 200 to be closed, so that air resistance is reduced while driving of the mobility vehicle thus improving the aerodynamic performance of the mobility vehicle.

The air conditioner system including the described-above structure is configured so that the external condenser is spaced from the radiator 21 at the front portion of the mobility vehicle and the external condenser performs heat exchange with air introduced a location other than the front portion of the mobility vehicle, so that the active air flap 200 is controlled to be closed in the indoor heating condition. Therefore, as the air resistance is reduced while the mobility vehicle drives under the indoor heating condition, the air resistance is reduced and the aerodynamic performance of the mobility vehicle is improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air conditioner system for a mobility vehicle, the air conditioner system comprising:
   an air conditioner including an internal condenser, an evaporator, and an external condenser that are modularized;
   an active air flap configured to selectively intermit air passing through a radiator; and
   a controller configured to allow air to pass through the evaporator of the air conditioner and to allow the active air flap to be opened in indoor cooling, and configured to allow the air to pass through the internal condenser of the air conditioner and to allow the active air flap to be closed in indoor heating.

2. The air conditioner system of claim 1, wherein the air conditioner further includes a first housing and a second housing, the first housing including a first blower therein and ventilating outdoor air or indoor air through the first housing, and the second housing fluidically-communicating with the first housing and including the internal condenser, the evaporator, the external condenser, and a second blower therein.

3. The air conditioner system of claim 2, wherein the second housing includes:
   a first space in which the internal condenser and the evaporator are provided; and
   a second space in which the external condenser and the second blower are provided,
   wherein the first housing and the first space of the second housing fluidically communicate with each other, and
   wherein the second space of the second housing is formed so that the outdoor air or air in power electronic (PE) module is selectively ventilated thereinto.

4. The air conditioner system of claim 3,
   wherein the second space of the second housing includes a change door between a ventilation path of the outdoor air and an air ventilation path of the PE module, and
   wherein the change door is configured to allow the outdoor air or the air of the PE module to be selectively ventilated into the external condenser.

5. The air conditioner system of claim 4,
   wherein the second housing includes a temperature adjustment door between the internal condenser and the evaporator, and
   wherein the temperature adjustment door is configured to allow air to be selectively ventilated into the internal condenser and the evaporator.

6. The air conditioner system of claim 5, further including:
   a refrigerant line in which a refrigerant is circulated, wherein a compressor, the internal condenser, the external condenser, an expander, and the evaporator are provided in the refrigerant line; and
   a coolant line in which a coolant is circulated,
   wherein a heat exchanger performing heat exchange with the refrigerant, a valve, the PE module, a battery module, and the radiator are provided in the coolant line.

7. The air conditioner system of claim 6,
   wherein the valve includes a first valve and a second valve,
   wherein the heat exchanger includes a first heat exchanger and a second heat exchanger, and
   wherein the coolant line includes:
      a first coolant line in which the radiator, the first heat exchanger, a reservoir, a first water pump, the PE module, and the first valve are provided, and
      a second coolant line diverging from the reservoir of the first coolant line, wherein the second valve, the battery module, a second water pump, and the second heat exchanger are provided in the second coolant line.

8. The air conditioner system of claim 7, wherein the coolant line further includes:
   a first bypass line provided to diverge from the second coolant line to connect to the second heat exchanger and the second valve to bypass the second water pump and the battery module.

9. The air conditioner system of claim 8, wherein the coolant line further includes:
   a second bypass line provided to diverge from the second coolant line to bypass the first bypass line, the second water pump and the battery module.

10. The air conditioner system of claim 9, wherein a first end portion of the second bypass line is connected to a first portion of the second coolant line between the second valve and the battery module, and a second end portion of the second bypass line is connected to a second portion of the second coolant line between the first valve and the second water pump to bypass the first bypass line, the second water pump and the battery module.

11. The air conditioner system of claim 7,
    wherein the expander includes a first expander, a second expander and a third expander, and
    wherein the refrigerant line includes:
       a first refrigerant line, in which the compressor, the internal condenser, the first heat exchanger, the first expander, the external condenser, the second expander, and the evaporator are provided, and
       a second refrigerant line diverging from the first refrigerant line and connected to the compressor, wherein the third expander and the second heat exchanger are provided in the second refrigerant line.

12. The air conditioner system of claim 11, wherein in cooling air, the controller is configured to allow the first expander to be opened, the second expander and the third expander to expand the refrigerant, and the first valve and the second valve to be switched so that the coolant is circulated in each of the first coolant line and the second coolant line.

13. The air conditioner system of claim 12, wherein in cooling the air, the controller is configured to allow a fan of the radiator to be driven and the active air flap to be opened.

14. The air conditioner system of claim 11, wherein in heating the air, the controller is configured to allow the first expander to expand the refrigerant, the second expander to be closed, the third expander to be opened, and the first valve and the second valve to be switched so that the refrigerant is circulated into the second coolant line with the first water pump and the PE module of the first coolant line.

15. The air conditioner system of claim 14, wherein in heating air, the controller is configured to allow a fan of the radiator to be unoperated and the active air flap to be closed.

16. A method of controlling the air conditioner system of claim 11, wherein in cooling air, the controller is configured to allow the first expander to be opened, the second expander and the third expander to expand the refrigerant, and the first valve and the second valve to be switched so that the coolant is circulated in each of the first coolant line and the second coolant line.

17. The method of claim 16, wherein in cooling the air, the controller is configured to allow a fan of the radiator to be driven and the active air flap to be opened.

18. The method of claim 16, wherein in heating air, the controller is configured to allow the first expander to inflate expand the refrigerant, the second expander to be closed, the third expander to be opened, and the first valve and the second valve to be switched so that the refrigerant is circulated into the second coolant line with the first water pump and the PE module of the first coolant line.

19. The method of claim 18, wherein in heating the air, the controller is configured to allow a fan of the radiator to be unoperated and the active air flap to be closed.

20. A non-transitory computer readable storage medium on which a program for performing the method of claim 16 is recorded.

* * * * *